(12) United States Patent
Ozaki (10) Patent No.: US 6,954,889 B2
(45) Date of Patent: Oct. 11, 2005

(54) CIRCUIT FOR MODIFYING STORED DATA

(75) Inventor: Shinji Ozaki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 764 days.

(21) Appl. No.: 09/877,232

(22) Filed: Jun. 11, 2001

(65) Prior Publication Data

US 2002/0049935 A1 Apr. 25, 2002

(30) Foreign Application Priority Data

Jun. 12, 2000 (JP) .............................. 2000-174798

(51) Int. Cl.[7] .......................... G06F 11/00; H04L 1/00
(52) U.S. Cl. ...................................... 714/747; 714/6
(58) Field of Search ............................ 714/747, 746, 714/6

(56) References Cited

U.S. PATENT DOCUMENTS

| | | | |
|---|---|---|---|
| 4,385,351 A | * | 5/1983 | Matsuura et al. .............. 712/29 |
| 4,780,875 A | * | 10/1988 | Sakai .......................... 714/757 |
| 5,301,281 A | * | 4/1994 | Kennedy ....................... 710/307 |
| 5,377,338 A | * | 12/1994 | Olson et al. ................... 710/22 |
| 5,574,926 A | | 11/1996 | Miyazawa et al. |
| 5,938,774 A | * | 8/1999 | Hsu ............................... 714/6 |

FOREIGN PATENT DOCUMENTS

| | | |
|---|---|---|
| JP | 64-057498 | 3/1989 |
| JP | 11-039213 | 2/1999 |

* cited by examiner

*Primary Examiner*—Joseph Torres
(74) *Attorney, Agent, or Firm*—McDermott Will & Emery LLP (57) ABSTRACT

A stored data modifier modifies data starting at any arbitrary address on a storage medium that should output a data word with a multi-byte width. A masked ROM outputs a $2^N$-byte data word starting at an address specified as a multiple of $2^N$ by an address signal. A correspondence detector determines whether or not correspondence is found between a correction address and one of a number $2^N$ of addresses starting at, or preceding, the address specified by the address signal. If the correspondence detector has found the correspondence, a stored data selecting section selectively outputs, on a byte-by-byte basis, either the output of the masked ROM or correction data in accordance with the address signal and the correction address.

11 Claims, 7 Drawing Sheets

FIG. 3A
before modification

```
00004080   70         MOV (A0), D0
00004081   FAC03412   ADD  0x1234, D0  (error)
00004085   02AB89     MOV  D0, (0x89ab)
```

FIG. 3B
after modification

```
00004080   70         MOV (A0), D0
00004081   FAFF6745   CALL 0x4567  (corrected)
00004085   02AB89     MOV  D0, (0x89ab)
```

FIG. 4

FIG. 5A
before modification

```
          ⋮          ⋮              ⋮
00004080  70         MOV (A0), D0
00004081  FAC03412   ADD 0x1234, D0   (error)
00004085  02AB89     MOV D0, (0x89ab)
          ⋮          ⋮              ⋮
00004104  71         MOV (A1), D0
00004105  FAE00400   AND 0x0004, D0   (error)
00004109  A004       CMP 0x04, D0     (error)
0000410B  C810       BEQ 0x10
          ⋮          ⋮              ⋮
```

FIG. 5B
after modification

```
          ⋮          ⋮              ⋮
00004080  70         MOV (A0), D0
00004081  FAFF6745   CALL 0x4567      (corrected)
00004085  02AB89     MOV D0, (0x89ab)
          ⋮          ⋮              ⋮
00004104  71         MOV (A1), D0
00004105  FAE00800   AND 0x0008, D0   (corrected)
00004109  A008       CMP 0x08, D0     (corrected)
0000410B  C810       BEQ 0x10
          ⋮          ⋮              ⋮
```

FIG. 6A
before modification

```
00004080   70         MOV (A0),D0
00004081   FAC03412   ADD 0x1234,D0    (error)
00004085   02AB89     MOV D0,(0x89ab)  (error)
```

FIG. 6B
after modification

```
00004080   70         MOV (A0),D0
00004081   FAFF6745   CALL 0x4567      (corrected)
00004085   02EFCD     MOV D0,(0xcdef)  (corrected)
```

FIG. 7
PRIOR ART

CIRCUIT FOR MODIFYING STORED DATA

BACKGROUND OF THE INVENTION

The present invention relates to a circuit for use in an LSI such as a microprocessor or digital signal processor (DSP) to correct errors that have been found in data stored on some storage medium like a masked ROM for the LSI.

Recently, the number of devices integrated together in a digital LSI, like a microprocessor or DSP, has been rising steeply and a memory circuit built in that LSI has its storage capacity increased year after year. Among other things, a masked ROM has a storage capacity much greater than that of a memory of any other type, and is mainly used as storage of a program to be executed by a processor.

As its name signifies, a masked ROM is an electrically non-alterable, read-only memory. So a program to be executed by its host processor or data required for that purpose is written on a ROM of this type while the LSI including the ROM is being fabricated. However, the greater the size of a program to be written, the more likely the program contains some errors. Accordingly, it has become more and more difficult to eliminate errors from a program of that huge size while an LSI is being fabricated. Thus, where errors have been found in a program or data that was stored on a masked ROM while an LSI was being fabricated, those errors should be corrected in some way or other when the LSI is operated.

Figure 7:
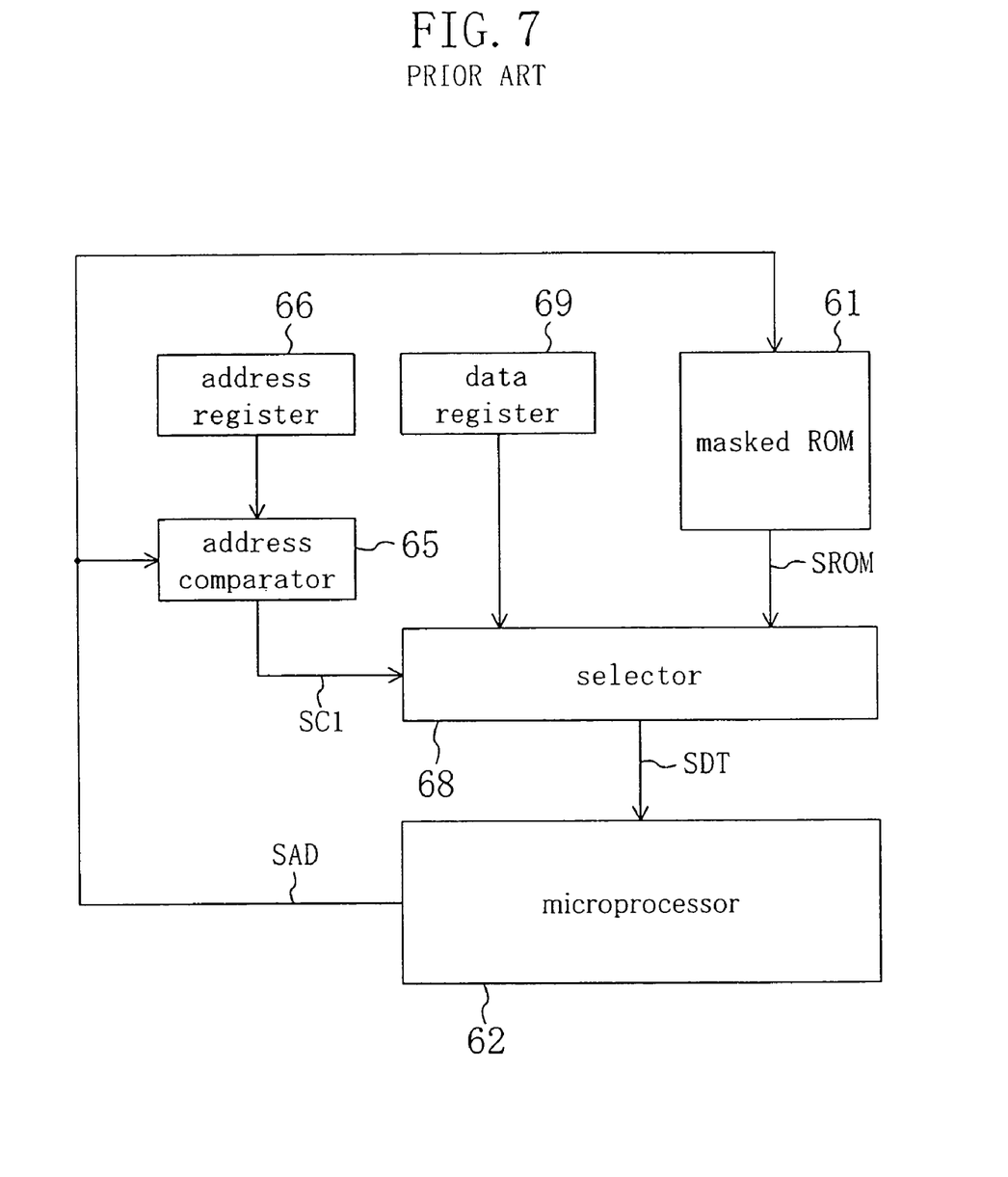
FIG. 7 is a block diagram illustrating a configuration for a known stored data modifier.

FIG. 7 is a block diagram illustrating a known stored data modifier. A microprocessor 62 outputs an address signal SAD, specifying the address of data to be read out from a masked ROM 61, to the masked ROM 61 and an address comparator 65. In response to the address signal SAD, the masked ROM 61 outputs the data, which has been stored at the address specified by the address signal SAD, as a ROM data signal SROM to a selector 68. An address register 66 outputs a reference address signal to be compared to the address signal SAD. On receiving the address signal SAD and reference address signal, the address comparator 65 compares these signals to each other. And if the comparator 65 finds these signals matching, the comparator 65 outputs a correspondence signal SCI to the selector 68. If the selector 68 has received this correspondence signal SC1, the selector 68 selectively delivers the output of a data register 69 as a data signal SDT to the microprocessor 62. Otherwise, the selector 68 selectively outputs the ROM data signal SROM as another data signal SDT to the microprocessor 62.

When the data modifier shown in FIG. 7 finds an error in the program or data stored on the masked ROM 61, the modifier specifies the address associated with the error on the address register 66 and stores substitute correction data on the data register 69. In this case, where the microprocessor 62 has specified the address of error-free data, the address comparator 65 does not find the address signal SAD and the reference address signal matching. Accordingly, the ROM data signal SROM, output from the masked ROM 61, is delivered to the microprocessor 62. However, where the microprocessor 62 has specified the address of data containing an error, the address comparator 65 does find the address signal SAD and the reference address signal matching. As a result, the correction data, which has been pre-stored in the data register 69, is sent to the microprocessor 62. In this manner, the erroneous program or data stored on the masked ROM 61 can be modified.

In the known data modifier, if the microprocessor 62 has specified the address of data containing an error, then the erroneous data, read out from the masked ROM 61, is replaced at a time with the correction data that has been stored on the data register 69.

Suppose the masked ROM 61 of this data modifier outputs a data word with a multi-byte width, e.g., a 4-byte width. That is to say, let us suppose that the masked ROM 61 should read out 4-byte data at a time as a data word. In that case, if a 4-byte data word output contains errors, then the 4-byte data word, starting at an address represented by a multiple of four (which will be herein called a "4-byte-aligned address" or an "access boundary"), is replaced at a time. Then, the erroneous data word cannot be modified on an arbitrary unit. In other words, the data word to be replaced cannot start at an arbitrary address.

The microprocessor may issue a set of instructions of various lengths. That is to say, the number of bytes of one operation code for an instruction may be different from that of another. In that case, an operation code for an instruction included in the set may require reading data, starting at a non-4-byte-aligned address and covering two or more data words, from the masked ROM. Accordingly, if an instruction requires data covering a storage area, including, but not starting at, a 4-byte-aligned access boundary on the masked ROM, then it is difficult for the known data modifier to modify the data required even when the number of bytes of the instruction is four less.

SUMMARY OF THE INVENTION

It is therefore an object of the present invention to provide a stored data modifier that can modify data starting at any arbitrary address on some storage medium, like a masked ROM, which should output data with a multi-byte width.

To achieve this object, the stored data modifier of the present invention includes a correspondence detector and a stored data selecting section. The correspondence detector determines whether or not correspondence is found between a correction address and a specified address or between the correction address and one of a predetermined number of addresses starting at or preceding the specified address. The stored data selecting section selectively delivers, on a byte-by-byte basis, either the output data of storage means or correction data in accordance with the low-order bit value of the correction address.

Specifically, an inventive stored data modifier modifies output data of storage means that outputs a data word with a width of $2^N$ (where N is a natural number) bytes. The data word is stored at respective addresses, starting at an address specified as a multiple of $2^N$ by an address signal, on the storage means. The circuit includes data register, address register, correspondence detector and stored data selecting section. The data register retains correction data with the width of $2^N$ bytes thereon. The address register retains a correction address thereon. The correspondence detector receives the address signal and the correction address and determines whether or not correspondence is found between the correction address and one of a number $2^N$ of addresses starting at, or preceding, the address specified by the address signal. If the correspondence detector has found the correspondence, the stored data selecting section selectively outputs, on a byte-by-byte basis, either the output data of the storage means or the correction data in accordance with the address signal and the correction address. The inventive circuit delivers the output of the stored data selecting section as modified stored data.

According to the present invention, the correspondence detector can determine whether or not correspondence is found between a correction address and a specified address or between the correction address and one of a predetermined number of addresses starting at or preceding the specified address. And if the correspondence detector has found the correspondence, the stored data selecting section selectively outputs, on a byte-by-byte basis, either the output data of the storage means or the correction data in accordance with the address signal and the correction address. Thus, the inventive data modifier can modify data starting at any arbitrary address. For example, the circuit can correct any error found in an operation code covering a storage area including, but not starting at, an access boundary.

In one embodiment of the present invention, the stored data selecting section preferably includes a byte selector and a byte selection controller. The byte selector selectively outputs, on a byte-by-byte basis, either the output data of the storage means or the correction data. The byte selection controller controls the selective output of the byte selector in accordance with an $N^{th}$-bit value of the address signal, a low-order-(N+1)-bit value of the correction address and the output of the correspondence detector.

In this particular embodiment, the byte selection controller preferably controls the byte selector in such a manner that an $M^{th}$ byte (where M is an integer and $0 \leq M < 2^N$) of the correction data is selected as an $M^{th}$-byte output of the byte selector if a) the correspondence detector has found the correspondence; and b)-i) the $N^{th}$-bit value of the address signal is equal to an $N^{th}$-bit value of the correction address and a low-order-N-bit value of the correction address is less than (M+1); or b)-ii) the $N^{th}$-bit value of the address signal is different from the $N^{th}$-bit value of the correction address and the low-order-N-bit value of the correction address is equal to or greater than (M+1), and that an $M^{th}$-th-byte output of the storage means is selected as the $M^{th}$-byte output of the byte selector if the conditions a) and b) are not met. This type of control is effectively applicable where the little endian method is adopted as a byte storing method.

In another embodiment of the present invention, the inventive circuit may further include a data rotator for rotating the correction data on a byte-by-byte basis by the number of bytes that corresponds to a low-order-N-bit value of the correction address. In that case, the stored data selecting section preferably receives the output of the data rotator instead of the correction data. Then, correction data can be stored on the data register in the very order in which the respective bytes thereof will be subject to modification.

In still another embodiment, if a result obtained by subtracting a value of the correction address excluding low-order N bits thereof from a value of the address signal excluding low-order N bits thereof is "0 or 1", then the correspondence detector should find the correspondence.

Another inventive stored data modifier modifies data read out from storage means that outputs a data word with a width of $2^N$ (where N is a natural number) bytes. The data word is stored at respective addresses, which start at an address specified as a multiple of $2^N$ by an address signal, on the storage means. The circuit includes a number of data registers, the same number of address registers, the same number of correspondence detectors, data register selector, address register selector and stored data selecting section. Each of the data registers retains correction data with the width of $2^N$ bytes thereon. Each of the address registers retains a correction address thereon. The data and address registers together form the same number of register pairs. Each of the correspondence detectors is associated with one of the register pairs and determines, responsive to the address signal and the correction address retained on the associated address register, whether or not correspondence is found between the correction address and one of a number $2^N$ of addresses starting at the address specified by the address signal or between the correction address and one of a number $(2^N-1)$ of addresses preceding the address specified by the address signal. The data register selector receives the outputs of the correspondence detectors and outputs, as selected correction data, the correction data retained on one of the data registers that is associated with one of the correspondence detectors that has found the correspondence. The address register selector also receives the outputs of the correspondence detectors and outputs, as a selected correction address, the correction address retained on one of the address registers that is associated with the correspondence detector that has found the correspondence. If the correspondence detector has found the correspondence, the stored data selecting section selectively outputs, on a byte-by-byte basis, either the output data of the storage means or the selected correction data, output from the data register selector, in accordance with the address signal and the selected correction address output from the address register selector. The circuit delivers the output of the stored data selecting section as modified stored data.

In one embodiment of the present invention, the stored data selecting section may include a byte selector and a byte selection controller. Preferably, the byte selector selectively outputs, on a byte-by-byte basis, either the output data of the storage means or the selected correction data received from the data register selector. The byte selection controller preferably controls the selective output of the byte selector in accordance with an $N^{th}$-bit value of the address signal, a low-order-(N+1)-bit value of the selected correction address received from the address register selector and the outputs of the correspondence detectors.

In this particular embodiment, the byte selection controller preferably controls the byte selector in such a manner that an $M^{th}$ byte (where M is an integer and $0 \leq M < 2^N$) of the correction data is selected as an $M^{th\text{-}byte}$ output of the byte selector if a) one of the correspondence detectors has found the correspondence; and b)-i) the $N^{th}$-bit value of the address signal is equal to an $N^{th}$-bit value of the selected correction address and a low-order-N-bit value of the selected correction address is less than (M+1); or b)-ii) the $N^{th}$-bit value of the address signal is different from the $N^{th}$-bit value of the selected correction address and the low-order-N-bit value of the selected correction address is equal to or greater than (M+1), and that an $M^{th}$-byte output of the storage means is selected as the $M^{th}$-byte output of the byte selector if the conditions a) and b) are not met. This type of control is effectively applicable where the little endian method is adopted as a byte storing method.

In still another embodiment, the inventive circuit may further include a data rotator for rotating the selected correction data on a byte-by-byte basis by the number of bytes that corresponds to a low-order-N-bit value of the selected correction address. In that case, the stored data selecting section preferably receives the output of the data rotator instead of the selected correction data. Then, correction data can be stored on the data register in the very order in which the respective bytes thereof will be subject to modification.

In yet another embodiment, if a result obtained by subtracting a value of the correction address excluding low-order N bits thereof from a value of the address signal excluding low-order N bits thereof is "0" or if the result is "1" but a low-order-N-bit value of the correction address is not "0", then each said correspondence detector should find the correspondence.

DESCRIPTION OF THE PREFERRED EMBODIMENTS

Hereinafter, preferred embodiments of the present invention will be described with reference to the accompanying drawings.

Embodiment 1

Figure 1:
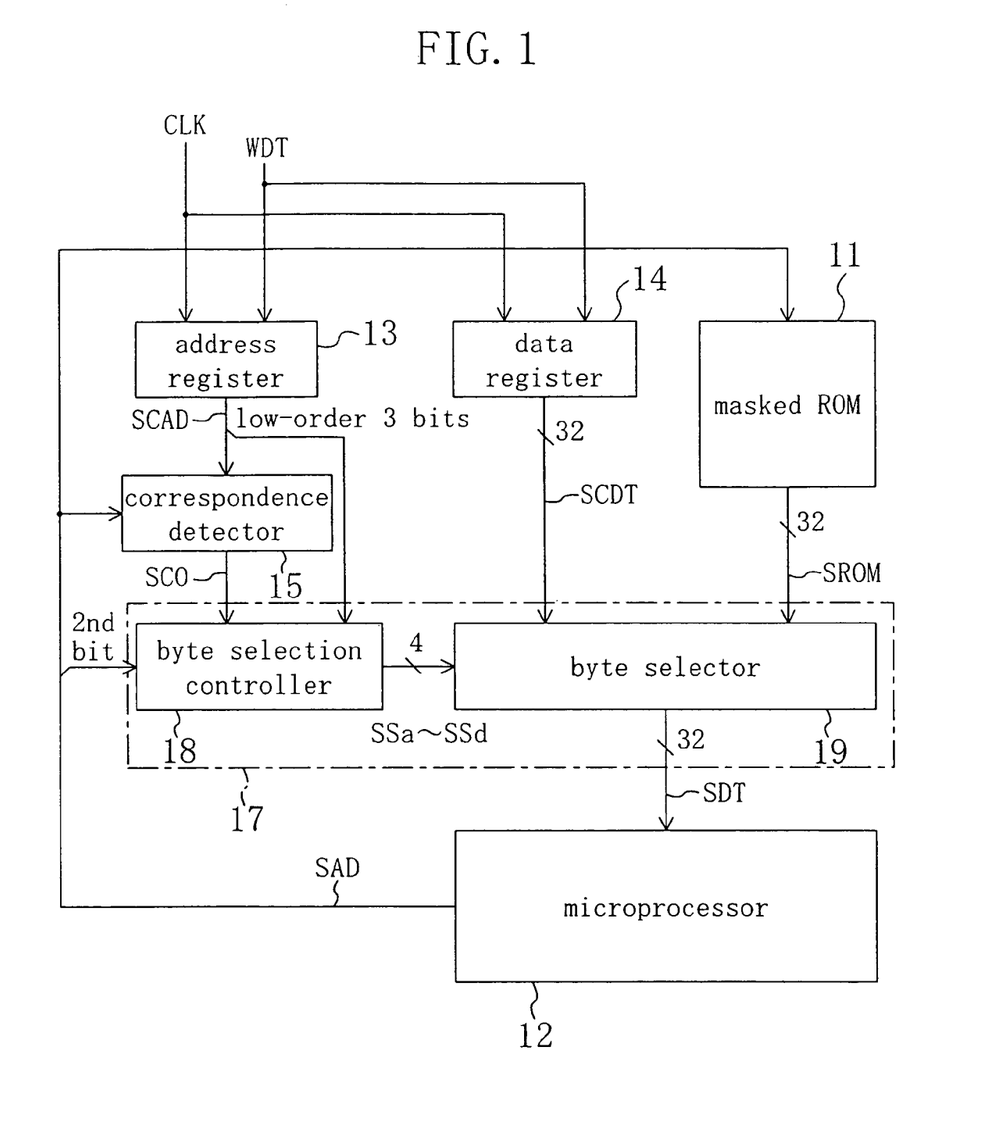
FIG. 1 is a block diagram illustrating a configuration for a stored data modifier according to a first embodiment of the present invention.

FIG. 1 illustrates a configuration for a stored data modifier according to a first embodiment of the present invention. This circuit is built in an LSI and forms an integral part of a so-called "one-chip microcomputer".

In FIG. 1, a microprocessor 12 operates on a 32-bit basis and accesses a masked ROM 11 by outputting an address signal SAD to the ROM 11. A program to be executed by the microprocessor 12 is stored on the ROM 11 as an exemplary storage means as defined in the appended claims.

The masked ROM 11 outputs a data word with a width of 4 ($=2^2$) bytes, i.e., 32 bits, so that 4-byte data can be read out from the ROM 11 at a time. That is to say, the address signal SAD specifies an address as a multiple of four (i.e., an address with low-order 2 bits of "00"). Thus, every time the microprocessor 12 accesses the masked ROM 11, the ROM 11 outputs a data word consisting of contiguous 4 bytes, starting at an address specified as a multiple of four by the address signal SAD, as a ROM data signal SROM. It should be noted that not only the program to be executed by the microprocessor 12 but also data to be used by the microprocessor 12 for processing purposes are also stored on the masked ROM 11.

The microprocessor 12 issues variable-length instructions to realize programming efficiently. That is to say, the number of bytes of an operation code for each single instruction is variable depending on the specific type of the instruction. However, each instruction is stored at an arbitrary address on the masked ROM 11. Accordingly, the operation code of a single instruction might be unable to fall within a storage area corresponding to one access operation (i.e., four bytes starting at an address specified by the address signal SAD). Rather, the operation code could possibly cover a storage area requiring two or more access operations.

Also, the microprocessor 12 is herein supposed to adopt the little endian method as a byte storing method. Specifically, the 4 bytes in a data word read out from the masked ROM 11 will be stored on the microprocessor 12 in the order of $0^{th}$, $1^{st}$, $2^{nd}$ and $3^{rd}$ bytes, where the $0^{th}$ byte starts at an address specified by the address signal SAD.

In FIG. 1, an address register 13 retains a correction address SCAD thereon, while a data register 14 retains correction data SCDT with a width of 4 bytes (i.e., 32 bits) thereon. A serial write clock signal CLK and a serial write data signal WDT are input to both of the address and data registers 13 and 14. These signals CLK and WDT are supplied through respective external terminals of the one-chip microcomputer including the data modifier shown in FIG. 1. By changing the level of the serial write data signal WDT synchronously with the serial write clock signal CLK, any correction address SCAD and any correction data SCDT can be specified for the address and data registers 13 and 14 externally from the one-chip microcomputer.

As shown in FIG. 1, the address signal SAD output from the microprocessor 12 is also input to a correspondence detector 15, not just to the masked ROM 11. The correspondence detector 15 compares the input address signal SAD to the correction address SCAD stored on the address register 13 and outputs a correspondence detection signal SCO when the detector 15 finds correspondence between them.

More specifically, if the correction address SCAD is included in a set of four addresses starting at, or preceding, the address specified by the input address signal SAD, then the detector 15 outputs an H-level correspondence detection signal SCO. That is to say, if the address signal SAD instructs to access a set of four bytes, including a byte specified by the correction address SCAD and starting at a 4-byte-aligned address, and another set of four bytes succeeding the former set, then the detector 15 asserts the correspondence detection signal SCO. More specifically, the detector 15 subtracts a value of the correction address SCAD excluding the low-order 2 bits thereof from a value of the address signal SAD excluding the low-order 2 bits thereof. And if the remainder is "0" or "1" (this means that (address signal SAD−correction address SCAD) is −3 or more and 4 or less), then the detector 15 outputs the H-level correspondence detection signal SCO.

The correspondence detection signal SCO is input to a byte selection controller 18 for use to control a byte selector 19. The byte selector 19 and byte selection controller 18 together makes up a stored data selecting section 17.

Figure 2:
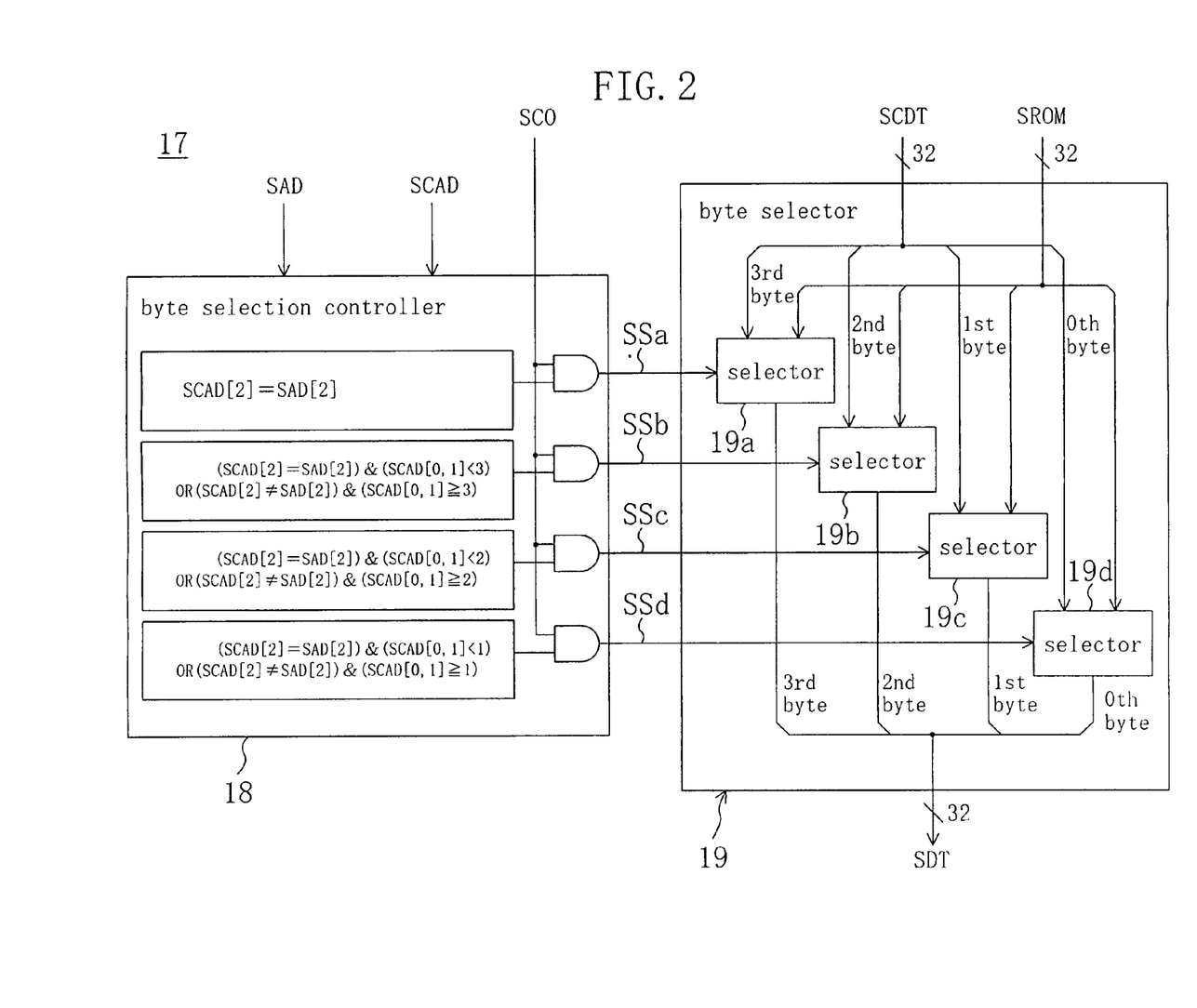
FIG. 2 is a block diagram illustrating a detailed configuration for the stored data selecting section shown in FIG. 1.

FIG. 2 illustrates a detailed configuration for the stored data selecting section 17. As shown in FIG. 2, the byte selector 19 receives a 4-byte ROM data signal SROM and 4-byte correction data SCDT output from the data register 14. The byte selector 19 includes four selectors 19a through 19d, which are provided for the respective bytes of the ROM data signal SROM or correction data SCDT. Accordingly, the byte selector 19 can select either the ROM data signal SROM or correction data SCDT on a byte-by-byte basis and can output any combination of four bytes selected as a data signal SDT. The data signal SDT output is sent as modified stored data to the microprocessor 12.

The selection operations performed by the selectors 19a through 19d are respectively controlled responsive to byte selection control signals SSa through SSd output from the byte selection controller 18. If the associated byte selection control signal SSa, SSb, SSc or SSd is at H-level, each selector 19a, 19b, 19c or 19d selects the correction data SCDT. Otherwise, each selector 19a, 19b, 19c or 19d selects the ROM data signal SROM.

The byte selection controller 18 receives not only the correspondence detection signal SCO but also the low-order three (=2 +1) bits of the correction address SCAD and the second bit of the address signal SAD, thereby generating the byte selection control signals SSa through SSd. Specifically, the byte selection control signals SSa through SSd are respectively generated under the following combinations of conditions:

a) Byte Selection Control Signal SSa

If the correspondence detection signal SCO is at H-level and if the $2^{nd}$-bit value of the correction address SCAD is equal to the $2^{nd}$-bit value of the address signal SAD, then the byte selection controller 18 outputs an H-level byte selection control signal SSa so that the selector 19a selects the $3^{rd}$ byte of the correction data SCDT.

b) Byte Selection Control Signal SSb

If the correspondence detection signal SCO is at H-level, the $2^{nd}$-bit value of the correction address SCAD is equal to the $2^{nd}$-bit value of the address signal SAD and the low-order-2-bit value of the correction address SCAD is less than three, then the byte selection controller 18 outputs an H-level byte selection control signal SSb so that the selector 19b selects the $2^{nd}$ byte of the correction data SCDT. Also, if the correspondence detection signal SCO is at H-level, the $2^{nd}$-bit value of the correction address SCAD is different from the $2^{nd}$-bit value of the address signal SAD and the low-order-2-bit value of the correction address SCAD is three or more, then the byte selection controller 18 also outputs the H-level byte selection control signal SSb so that the selector 19b selects the $2^{nd}$ byte of the correction data SCDT.

c) Byte Selection Control Signal SSc

If the correspondence detection signal SCO is at H-level, the $2^{nd}$-bit value of the correction address SCAD is equal to the $2^{nd}$-bit value of the address signal SAD and the low-order-2-bit value of the correction address SCAD is less than two, then the byte selection controller 18 outputs an H-level byte selection control signal SSc so that the selector 19c selects the $1^{st}$ byte of the correction data SCDT. Also, if the correspondence detection signal SCO is at H-level, the $2^{nd}$-bit value of the correction address SCAD is different from the $2^{nd}$-bit value of the address signal SAD and the low-order-2-bit value of the correction address SCAD is two or more, then the byte selection controller 18 also outputs the H-level byte selection control signal SSc so that the selector 19c selects the $1^{st}$ byte of the correction data SCDT.

d) Byte Selection Control Signal SSd

If the correspondence detection signal SCO is at H-level, the $2^{nd}$-bit value of the correction address SCAD is equal to the $2^{nd}$-bit value of the address signal SAD and the low-order-2-bit value of the correction address SCAD is less than one, then the byte selection controller 18 outputs an H-level byte selection control signal SSd so that the selector 19d selects the $0^{th}$ byte of the correction data SCDT. Also, if the correspondence detection signal SCO is at H-level, the $2^{nd}$-bit value of the correction address SCAD is different from the $2^{nd}$-bit value of the address signal SAD and the low-order-2-bit value of the correction address SCAD is one or more, then the byte selection controller 18 also outputs the H-level byte selection control signal SSd so that the selector 19d selects the $0^{th}$ byte of the correction data SCDT.

Hereinafter, it will be described how the stored data modifier with such a configuration operates.

Figure 3A:
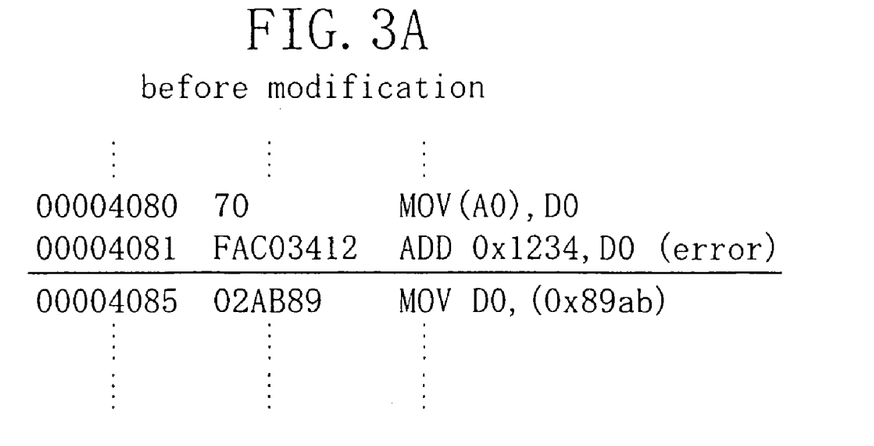
FIGS. 3A and 3B illustrate part of a program to be modified by the circuit of the first embodiment.

FIG. 3A illustrates part of a program stored on the masked ROM 11 while the one-chip microcomputer is fabricated. This part of the program is a list of instructions before an error found there is corrected. In FIGS. 3A, 3B, 5A, 5B, 6A and 6B, mnemonics of instructions are described on the right, operation codes thereof as hexadecimal representations in the middle, and addresses thereof on the ROM 11 as hexadecimal representations on the left. In the list illustrated in FIG. 3A, three instructions are described. As shown in FIG. 3A, a MOV instruction of reading out data from a memory onto a register is located in a storage area specified by the address "4080". An ADD instruction of adding the data read out is specified by the address "4081". And a MOV instruction of storing the sum back on the memory is specified by the address "4085". The sizes of these instructions are 1, 4 and 3 bytes, respectively. In this case, the operation code of the ADD instruction on the second row covers a storage area requiring two access operations (i.e., a set of four bytes starting at the address "4080" and another set of four bytes starting at the address "4084" ).

If this part of the program shown in FIG. 3A is used without being modified, the ROM data signal SROM, output from the masked ROM 11 on a four-byte basis, is passed as it is to the microprocessor 12.

First, a set of four bytes starting at the address "4080" (i.e., "70", "FA", "C0" and "34" in this order) is output as the ROM data signal SROM. Since no correction address SCAD has been specified on the address register 13 in this case, the correspondence detector 15 does not output the H-level correspondence detection signal SCO and the byte selection control signals SSa through SSd output from the byte selection controller 18 all remain low. Accordingly, the byte selector 19 outputs the set of four bytes, which has been input as the ROM data signal SROM, as the data signal SDT without modifying it. As a result, the four-byte data stored at respective addresses starting at "4080" on the masked ROM 11 is sent as it is to the microprocessor 12. In the same way, the next set of four bytes (i.e., "12 ", "02 ", "AB" and "89" in this order) starting at the address "4084" , is sent as it is as the data signal SDT to the microprocessor 12.

Figure 3B:
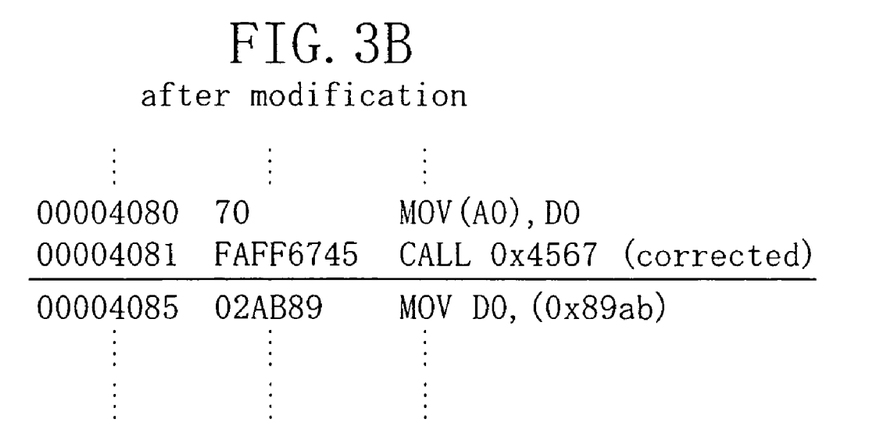

Suppose an error was found in the ADD instruction specified by the address "4081" after the one-chip microcomputer had been completed with the program written on the masked ROM 11. In that case, the ADD instruction specified by the address "4081" is herein replaced with a CALL (i.e., a subroutine branch) instruction as shown in FIG. 3B, thereby correcting the error found in this program.

To make this correction, before the microprocessor 12 executes the program (e.g., during a reset interval), the address "4081" and an operation code (FA, FF, 67, 45) are specified as the correction address SCAD and correction data SCDT for the address and data registers 13 and 14, respectively, by supplying the serial write clock and data signals CLK and WDT through the external terminals of the one-chip microcomputer.

The four bytes of the correction data SCDT should be sequentially specified from a byte position indicated by the low-order-2-bit value of the correction address SCAD. In the illustrated example, the low-order-2-bit value of the correction address SCAD (i.e., 4081) is "1". Accordingly, the first byte "FA" of the correction data SCDT is placed at the $1^{st}$ byte position on the data register 14. In the same way, the other three bytes "FF", "67" and "45" are placed at the $2^{nd}$, $3^{rd}$ and $0^{th}$ byte positions, respectively.

Next, it will be described how the data modifier of the first embodiment operates after the correction address SCAD and correction data SCDT have been specified.

When the microprocessor 12 accesses the masked ROM 11 with the address "4080" specified, the masked ROM 11 outputs the data word that was written thereon when the one-chip microcomputer was fabricated, i.e., "70", "FA", "C0" and "34", as the ROM data signal SROM just like before the program was modified. Then, the correspondence detector 15 compares the address "4080", specified by the address signal SAD to the correction address SCAD "4081" output from the address register 13. Since the detector 15 finds correspondence between the correction address "4081" and the four addresses starting at the specified address "4080",the detector 15 outputs an H-level correspondence detection signal SCO.

In this case, the $2^{nd}$-bit value of the address "4080" specified by the address signal SAD is "0", the $2^{nd}$-bit value of the correction address SCAD is also "0" and the low-order-2-bit value of the address SCAD is "1". Accordingly, the byte selection controller 18 outputs H-level byte selection control signals SSa through SSc and an L-level byte selection control signal SSd. In response, the selectors 19a through 19c in the byte selector 19 select the $3^{rd}$, $2^{nd}$ and $1^{st}$ bytes of the correction data SCDT output from the data register 14. On the other hand, the selector 19d still selects the same $0^{th}$ byte of the ROM data signal SROM just like before the program modification. As a result, the byte selector 19 outputs a data signal SDT comprised of "70", "FA", "FF" and "67" as $0^{th}$ through $3^{rd}$ bytes, respectively.

When the microprocessor 12 accesses the masked ROM 11 with the address "4084" specified, the masked ROM 11 outputs the data word that was written thereon when the one-chip microcomputer was fabricated, i.e., "12", "02", "AB" and "89", as the ROM data signal SROM just like before the program was modified. Then, the correspondence detector 15 compares the address "4084" specified by the address signal SAD to the correction address SCAD "4081" output from the address register 13. Since the detector 15 finds correspondence between the correction address "4081" and the four addresses preceding the specified address "4084", the detector 15 outputs an H-level correspondence detection signal SCO.

In this case, the $2^{nd}$-bit value of the address "4084" specified by the address signal SAD is "1". Accordingly, the byte selection controller 18 outputs L-level byte selection control signals SSa through SSc and an H-level byte selection control signal SSd. In response, the selectors 19a through 19c in the byte selector 19 select the $3^{rd}$, $2^{nd}$ and $1^{st}$ bytes of the ROM data signal SROM, while the selector 19d selects the $0^{th}$ byte of the correction data SCDT. As a result, the byte selector 19 outputs a data signal SDT comprised of "45", "02", "AB" and "89" as $0^{th}$ through $3^{rd}$ bytes, respectively.

On the other hand, if the microprocessor 12 accesses the masked ROM 11 at any address other than "4080" and "4084", then the correspondence detector 15 outputs an L-level correspondence detection signal SCO. In that case, the ROM data signal SROM output from the masked ROM 11 is sent as it is as the data signal SDT to the microprocessor 12.

In this manner, by setting "4081" as the correction address SCAD for the address register 13 and "45", "FA", "FF" and "67" as correction data SCDT for the data register 14, a data signal SDT consisting of the four bytes "70", "FA", "FF" and "67" is sent to the microprocessor 12 when the address specified is "4080". On the other hand, when the address specified is "4084",a data signal SDT consisting of the four bytes "45 ", "02", "AB" and "89" is sent to the microprocessor 12. As a result, the program is modified as shown in FIG. 3B.

As described above, according to this embodiment, the correspondence detector 15 and byte selection controller 18 controls the byte selector 19 so that the byte selector 19 selectively outputs the ROM data signal SROM output from the masked ROM 11 or the correction data SCDT on a byte-by-byte basis. Thus, even where an error was found in an instruction covering a storage area requiring two access operations (supposing the number of bytes of each instruction code is four or less) as in the example shown in FIGS. 3A and 3B, the instruction can be replaced easily.

In the foregoing embodiment, the microprocessor 12 is supposed to adopt the little endian method as a byte storing method. However, the present invention is easily implementable even if the microprocessor 12 adopts the big endian method. In that case, the byte selection control signals SSa through SSd output from the byte selection controller 18 should be differently associated with the selectors 19a through 19d included in the byte selector 19. Specifically, the selectors 19a, 19b, 19c and 19d should be controlled responsive to the byte selection control signals SSd, SSc, SSb and SSa, respectively.

Embodiment 2

Figure 4:
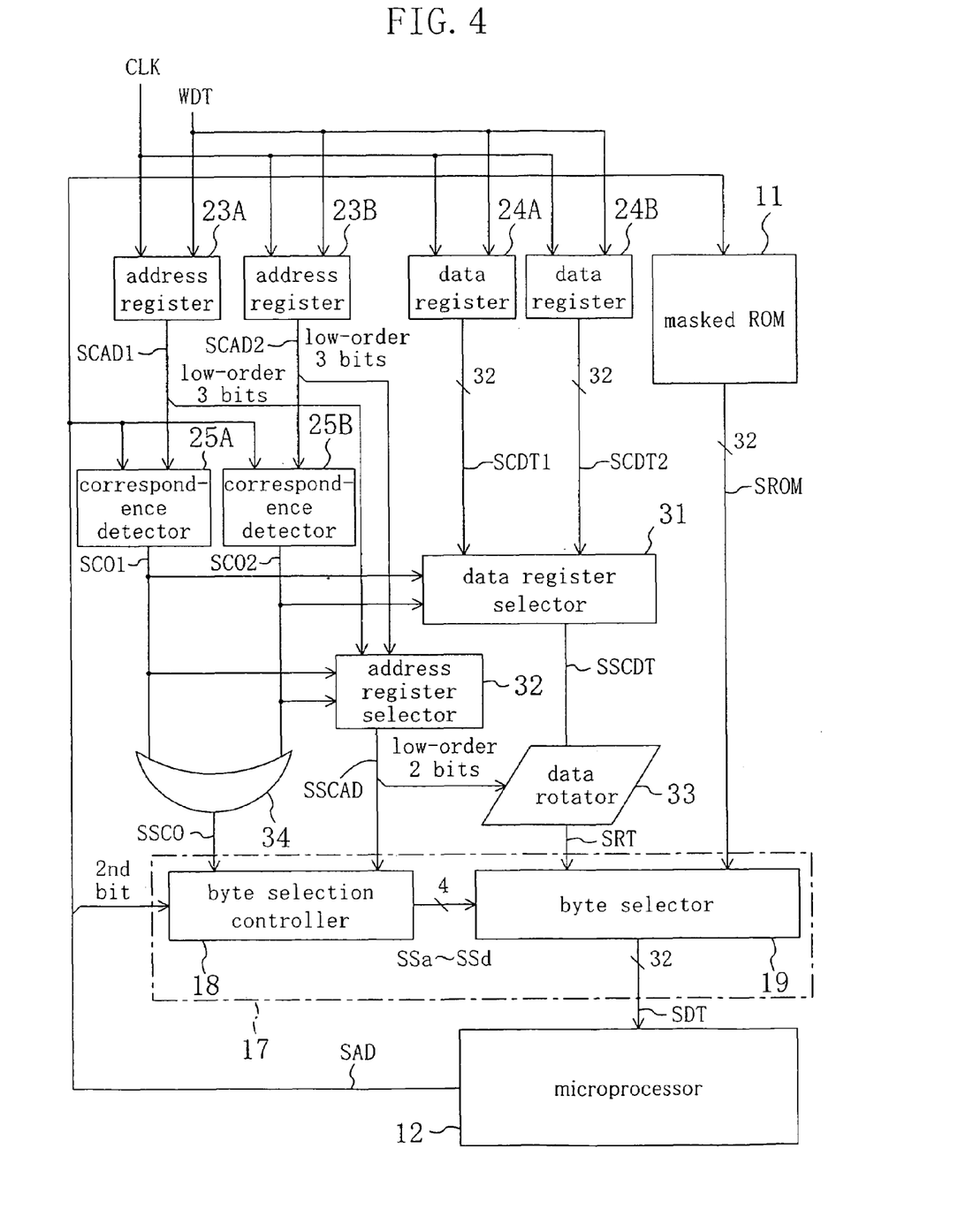
FIG. 4 is a block diagram illustrating a configuration for a stored data modifier according to a second embodiment of the present invention.

FIG. 4 illustrates a configuration for a stored data modifier according to a second embodiment of the present invention. This circuit is also built in an LSI and forms an integral part of a so-called "one-chip microcomputer". In FIG. 4, each component also shown in FIG. 1 is identified by the same reference numeral and the detailed description thereof will be omitted herein.

The data modifier shown in FIG. 4 includes first and second address registers 23A and 23B and first and second data registers 24A and 24B so that two errors found in the data on the masked ROM 11 can be corrected at a time.

Each of the first and second address registers 23A and 23B retains a correction address SCAD1 or SCAD2 thereon, while each of the first and second data registers 24A and 24B retains correction data SCDT1 or SCDT2 with a width of 4 bytes (i.e., 32 bits) thereon. As in the first embodiment, the serial write clock and data signals CLK and WDT are input to the address and data registers 23A, 23B, 24A and 24B. By using these signals CLK and WDT, any correction address SCAD1 or SCAD2 and any correction data SCDT1 or SCDT2 can be specified for the address and data registers 23A, 23B, 24A and 24B externally from the one-chip microcomputer.

As shown in FIG. 4, the data modifier further includes first and second correspondence detectors 25A and 25B. Each of these correspondence detectors 25A and 25B compares the input address signal SAD to the correction address SCAD1 or SCAD2 specified for the associated address register 23A or 23B, respectively. When the detector 25A or 25B finds correspondence between the associated correction address SCAD1 or SCAD2 and any of a predetermined number of addresses including the address specified by the input address signal SAD, the detector 25A or 25B outputs a correspondence detection signal SCO1 or SCO2. Specifically, if the correction address SCAD1 or SCAD2 is included in either a set of four addresses starting at the address specified by the input address signal SAD or a set of three addresses preceding the specified address, the detector 25A or 25B outputs an H-level correspondence detection signal SCO1 or SCO2.

Suppose the low-order-2-bit value of the correction address SCAD1 or SCAD2 is not "0". In that case, if the address signal SAD instructs to access a set of four bytes, including a byte specified by the correction address SCAD1 or SCAD2 and starting at a 4-byte-aligned address, and another set of four bytes succeeding the former set, then the detector 25A or 25B asserts the correspondence detection signal SCO1 or SCO2. But if the low-order-2-bit value of the correction address SCAD1 or SCAD2 is "0", it's a different story. In that case, only when the address specified by the address signal SAD matches the correction address SCAD1 or SCAD2, the detector 25A or 25B outputs an H-level correspondence detection signal SCO1 or SCO2. In this respect, the correspondence detector 25A or 25B of the second embodiment operates differently from the counterpart of the first embodiment.

More specifically, the detector 25A or 25B subtracts a value of the correction address SCAD1 or SCAD2 excluding the low-order 2 bits thereof from a value of the address signal SAD excluding the low-order 2 bits thereof. And if the remainder is "0" or if the remainder is "1" but the low-order-2-bit value of the correction address SCAD1 or SCAD2 is not "0" (this means that (address signal SAD-correction address SCAD1 or SCAD2) is −3 or more and 3 or less), then the detector 25A or 25B outputs the H-level correspondence detection signal SCO1 or SCO2.

The correspondence detection signals SCO1 and SCO2 are input to a data register selector 31 and an address register selector 32.

The data registers 24A and 24B respectively output the correction data SCDT1 and SCDT2 to the data register selector 31. In response to the H-level correspondence detection signal SCO1 or SCO2, the data register selector 31 selects the correction data SCDT1 or SCDT2 associated with the H-level detection signal SCO1 or SCO2, and then outputs the selected one as selected correction data SSCDT. The address registers 23A and 23B respectively output the low-order-3-bit values of the correction addresses SCDA1 and SCAD2 to the address register selector 32. In response to the H-level correspondence detection signal SCO1 or SCO2, the address register selector 32 selects the low-order-3-bit value of the correction address SCAD1 and SCAD2 associated with the H-level detection signal SCO1 or SCO2, and then outputs the selected one as a selected correction address signal SSCAD.

The selected correction data SSCDT output from the data register selector 31 and the low-order-2-bit value of the selected correction address signal SSCAD output from the address register selector 32 are input to a data rotator 33. The data rotator 33 rotates the value represented by the selected correction data SSCDT by the number of bytes corresponding to the low-order-2-bit value of the selected correction address signal SSCAD, thereby outputting the result as rotated data SRT.

The stored data selecting section 17 has the same configuration as the counterpart 17 of the first embodiment. Specifically, the byte selection controller 18 receives the selected correction address signal SSCAD and a logical sum SSCO, output by gate 34, of the correspondence detection signals SC01 and SC02 and generates the byte selection control signals SSa through SSd in accordance with the same logic as that applied to the first embodiment. The byte selector 19 receives the ROM data signal SROM with a width of 4 bytes and the rotated data SRT output from the data rotator 33. In response to the byte selection control signals SSa through SSd, the byte selector 19 selects, on a byte-by-byte basis, either the ROM data signal SROM or the rotated data SRT and then outputs a selected combination of bytes as a data signal SDT to the microprocessor 12.

Hereinafter, it will be described how the stored data modifier with such a configuration operates.

Figure 5A:
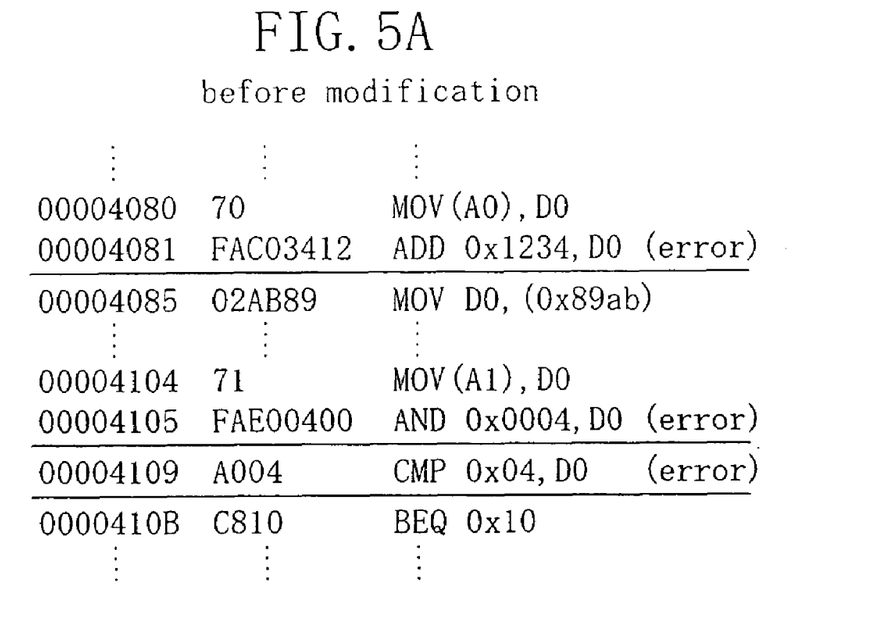
FIGS. 5A and 5B illustrate part of a program to be modified by the circuit of the second embodiment.

FIG. 5A illustrates part of a program stored on the masked ROM 11 while the one-chip microcomputer is fabricated. This part of the program is a list of instructions before errors found there are corrected. In the example illustrated in FIG. 5A, errors are supposed to be found not only in the ADD instruction with the address "4081" but also in AND and CMP instructions with the addresses "4105" and "4109", respectively. Accordingly, in the modified program list shown in FIG. 5B, the ADD instruction with the address "4081" has been replaced with a CALL instruction comprised of "FA", "FF", "67" and "45" and a set of four bytes starting at the address "4107" has been replaced with "08", "00", "A0" and "08" to correct the errors.

Figure 5B:
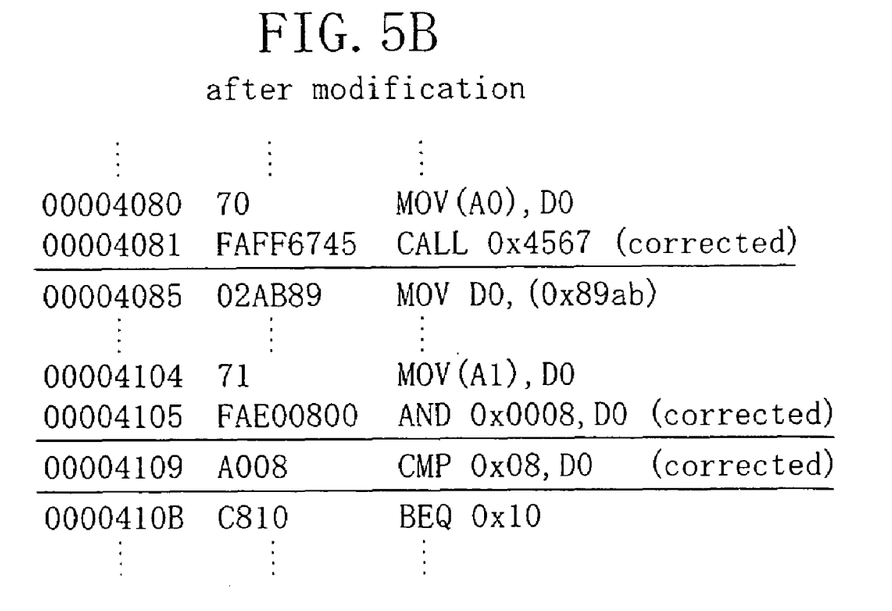

To make these corrections, before the microprocessor 12 executes the program (e.g., during a reset interval), the addresses "4081" and "4107" are specified as the correction addresses SCAD1 and SCAD2 at the address registers 23A and 23B and two sets of bytes "FA", "FF", "67" and "45" and "08", "00", "A0" and "08" are specified as the correction data SCDT1 and SCDT2 at the data registers 24A and 24B by supplying the serial write clock and data signals CLK and WDT through the external terminals of the one-chip microcomputer.

In the second embodiment, there is no need to determine the byte arrangement for the correction data SCDT1 and SCDT2 in accordance with the low-order-2-bit values of the correction addresses SCAD1 and SCAD2, respectively, unlike the first embodiment. That is to say, the respective bytes of the correction data SCDT1 or SCDT2 may be placed at the $0^{th}$, $1^{st}$, $2^{nd}$ and $3^{rd}$ bytes on the associated data register 24A or 24B in this order. This effect is attainable by additionally providing the data rotator 33 for this stored data modifier. As for the data rotator 33, it will be described later exactly how the rotator 33 operates.

Next, it will be described how the data modifier of the second embodiment operates after the correction addresses SCAD1 and SCAD2 and correction data SCDT1 and SCDT2 have been specified.

When the microprocessor 12 accesses the masked ROM 11 with the address "4080",specified, the masked ROM 11 outputs the data word that was written thereon when the one-chip microcomputer was fabricated, i.e., "70", "FA", "C0" and "34", as the ROM data signal SROM. Then, the first correspondence detector 25A compares the address "4080" specified by the address signal SAD to the correction address SCAD1 "4081" output from the first address register 23A. Since the detector 25A finds correspondence between the correction address SCAD1 "4081" and the four addresses starting at the specified address "4080",the detector 25A outputs an H-level correspondence detection signal SCO1. On the other hand, the second correspondence detector 25B compares the address "4080" specified by the address signal SAD to the correction address SCAD2 "4107" output from the second address register 23B. Since the detector 25B finds no correspondence between the correction address SCAD2 "4107" and a set of four addresses starting at the specified address "4080" or a set of three addresses preceding the specified address "4080", the detector 25B outputs an L-level correspondence detection signal SCO2.

In this case, the first correspondence detection signal SCO1 is high. Accordingly, the address register selector 32 selects the low-order-3-bit value of the correction address SCAD1 (with the address "4081") that has been output from the first address register 23A and then outputs the selected one as a selected correction address SSCAD. Also, the data register selector 31 selects the correction data SCDT1 that has been output from the first data register 24A and then outputs the selected one as selected correction data SSCDT.

Then, the low-order-2-bit value of the selected correction address SSCAD input to the data rotator 33 is "1". Thus, the data rotator 33 rotates the selected correction data SSCDT received, i.e., the output of the data register 24A consisting of "FA", "FF", "67" and "45", by one byte, thereby outputting a rotated data signal SRT comprised of "45", "FA", "FF" and "67".

In this case, the $2^{nd}$-bit value of the address "4080" specified by the address signal SAD is "0", the $2^{nd}$-bit value of the selected correction address SSCAD is also "0" and the low-order-2-bit value of the address SSCAD is "1". Accordingly, the byte selection controller 18 outputs H-level byte selection control signals SSa through SSc and an L-level byte selection control signal SSd. In response, the byte selector 19 selects the $0^{th}$ byte of the ROM data signal SROM and the $1^{st}$, $2^{nd}$ and $3^{rd}$ bytes of the rotated data signal SRT in combination for the data signal SDT. As a result, "70", "FA", "FF" and "67" are output as the data signal SDT.

In the same way, when the microprocessor 12 accesses the masked ROM 11 with the address "4084" specified, the first and second correspondence detectors 25A and 25B output H- and L-level correspondence detection signals SCO1 and SCO2, respectively. As a result, "45", "02", "AB" and "89" are output as the data signal SDT.

When the microprocessor 12 accesses the masked ROM 11 with the address "4104" specified, the first correspondence detector 25A compares the address "4104" specified by the address signal SAD to the correction address SCAD1 "4081". Since the detector 25A finds no correspondence between the correction address SCAD1 "4081" and a set of four addresses starting at the specified address "4104" or a set of three addresses preceding the specified address "4104", the detector 25A outputs an L-level correspondence detection signal SCO1. On the other hand, the second correspondence detector 25B compares the address "4104" specified by the address signal SAD to the correction address SCAD2 "4107". Since the detector 25B finds correspondence between the correction address SCAD2 "4107" and the four addresses starting at the specified address "4104", the detector 25B outputs an H-level correspondence detection signal SCO2. Accordingly, the address register selector 32 selects the low-order-3 bit value of the correction address SCAD2 (with the address "4107") and then outputs the selected one as a selected correction address SSCAD. Also, the data register selector 31 selects the correction data SCDT2 and then outputs it as selected correction data SSCDT.

In this case, the low-order-2-bit value of the selected correction address SSCAD input to the data rotator 33 is "3". Thus, the data rotator 33 rotates the selected correction data SSCDT received, i.e., the output of the data register 24B consisting of "08", "00", "A0" and "08", by three bytes, thereby outputting a rotated data signal SRT comprised of "00", "A0", "08" and "08".

Then, the $2^{nd}$-bit value of the address "4104" specified by the address signal SAD is "1", the $2^{nd}$-bit value of the selected correction address SSCAD is also "1" and the low-order-2-bit value of the address SSCAD is "3". Accordingly, the byte selection controller 18 outputs L-level byte selection control signals SSa through SSc and an H-level byte selection control signal SSd. In response, the byte selector 19 outputs "71", "FA", "E0" and "08" as the data signal SDT.

In the same way, when the microprocessor 12 accesses the masked ROM 11 with the address "4108" specified, the first and second correspondence detectors 25A and 25B output L- and H-level correspondence detection signals SCO1 and SCO2, respectively. As a result, "00", "A0", "08" and "C8" are output as the data signal SDT.

On the other hand, when the microprocessor 12 accesses the masked ROM 11 with any address other than "4080", "4084", "4104" or "4108" specified, the first and second correspondence detectors 25A and 25B each output an L-level correspondence detection signal SCO1 or SCO2. As a result, the ROM data signal SROM output from the masked ROM 11 is sent as a data signal SDT to the microprocessor 12 without being subjected to any modification.

In this embodiment, "4081" and "4107" are specified as correction addresses SCAD1 and SCAD2 for the address registers 23A and 23B and "FA", "FF", "67" and "45" and "08", "00", "A0" and "08", are specified as correction data SCDT1 and SCDT2 for the data registers 24A and 24B. Then, where the correction address SCAD1 is found in a predetermined number of addresses including a specified address, the correction data SCDT1 is sent to the microprocessor 12. On the other hand, where the correction address SCAD2 is found in a predetermined number of addresses including a specified address, the correction data SCDT2 is sent to the microprocessor 12. As a result, the program can be modified as shown in FIG. 5B.

Figure 6A:
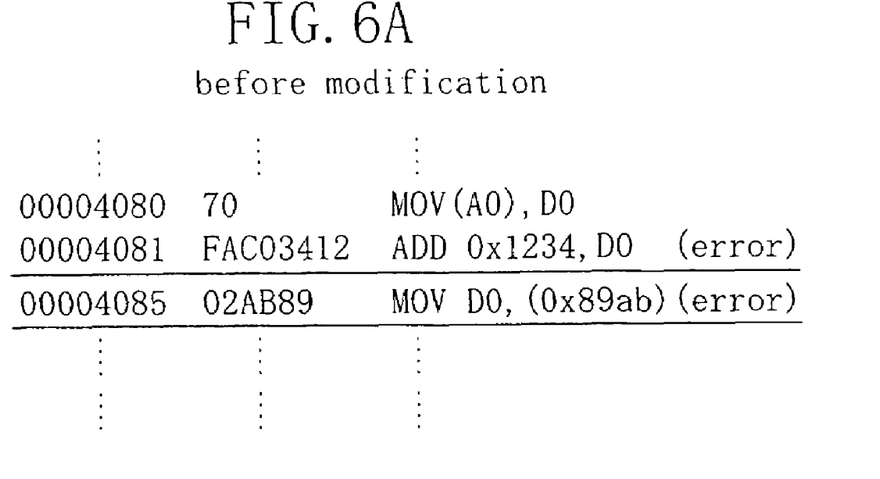
FIGS. 6A and 6B illustrate a different part of the program to be modified by the circuit of the second embodiment.

FIG. 6A also illustrates part of a program stored on the masked ROM 11 while the one-chip microcomputer is fabricated. This part of the program is a list of instructions before errors found there are corrected. In the example illustrated in FIG. 5A, errors are supposed to be found not only in the ADD instruction with the address "4081" but also in the MOV instruction with the address "4085". Accordingly, in the modified program list shown in FIG. 6B, the four bytes starting at the address "4081" are replaced with "FA", "FF", "67" and "45" and the three bytes starting at the address "4085" are replaced with "02", "EF" and "CD" to correct the errors.

In modifying a sequence covering a storage area of more than 4 contiguous bytes, 4-byte-aligned addresses are specified according to this embodiment as the correction addresses SCAD1 and SCAD2 for the address registers 23A and 23B. More specifically, addresses "4080" and "4084" are specified as the correction addresses SCAD1 and SCAD2 for the address registers 23A and 23B and "70", "FA", "FF" and "67" and "45", "02", "EF" and "CD" are specified as the correction data SCDT1 and SCDT2 for the data registers 24A and 24B.

According to these settings, when the microprocessor 12 accesses the masked ROM 11 with the address "4080" specified, H- and L-level signals are output as the first and second correspondence detection signals SCO1 and SCO2, respectively. In that case, the correction data SCDT1, output from the data register 24A, is delivered as selected correction data SSCDT from the data register selector 31, and then output as a rotated data signal SRT from the data rotator 33.

Also, since the byte selection control signals SSa through SSd output are all high, the correction data SCDT1 output from the data register 24A, i.e., "70", "FA", "FF" and "67", is delivered as the data signal SDT.

Figure 6B:
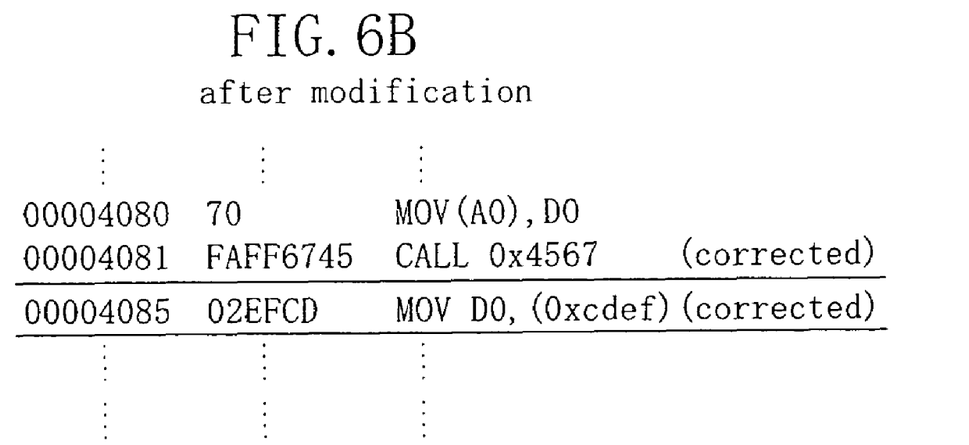

When the microprocessor 12 accesses the masked ROM 11 with the address "4084" specified, L- and H-level signals are output as the first and second correspondence detection signals SCO1 and SCO2, respectively. Accordingly, the correction data SCDT2 output from the data register 24B, i.e., "45", "02", "EF" and "CD", is delivered as the data signal SDT. As a result, the program can be modified as shown in FIG. 6B.

As described above, the stored data modifier of this embodiment includes two address registers, two data registers and two correspondence detectors. Accordingly, the data modifier can correct two errors in a single access as in the example illustrated in FIGS. 5A and 5B although such error correction usually requires two accesses. Also, if a given correction address is a 4-byte-aligned address, the correspondence detectors do not consider adjacent addresses into consideration. Thus, the data modifier can modify data consisting of four or more contiguous bytes that start at the 4-byte-aligned address.

Moreover, the data modifier of this embodiment further includes a data rotator for rotating correction data by the number of bytes corresponding to the low-order-2-bit value of a correction address. Accordingly, the respective bytes of correction data can be specified for a data register in the same order as what will be adopted for modification. It is naturally possible to omit the data rotator 33 so that the selected correction data SSCDT output from the data register selector 31 is input as it is to the byte selector 19. In that case, however, the respective bytes of correction data should be sequentially specified from a byte position indicated by the low-order-2-bit value of the correction address as in the first embodiment.

On the other hand, if the data rotator of the second embodiment is additionally provided for the data modifier of the first embodiment, the effects of the second embodiment are also attainable. Specifically, a data rotator for rotating correction data SCDT by the number of bytes corresponding to the low-order-2-bit value of the correction address SCAD may be placed between the data register 14 and byte selector 19 in the data modifier shown in FIG. 1. Then, the respective bytes of the correction data SCDT can be specified for the data register 14 in the same order as what will be adopted for modification.

The data modifier of the second embodiment includes a pair of address registers, a pair of data registers and a pair of correspondence detectors. However, it would be obvious to those skilled in the art that three or more address registers, data registers or correspondence detectors may be provided instead.

In the foregoing illustrative embodiments, N is supposed to be two and a data word consisting of 4 ($=2^2$) bytes is read out at a time from the masked ROM 11. Alternatively, the present invention is naturally applicable to any other masked ROM that outputs a data word consisting of any other power-of-two bytes.

Also, in the foregoing embodiments, the correction address and correction data are supposed to be specified through external terminals of a one-chip microcomputer. Instead, the correction address and correction data may also be specified using a program executed by the microprocessor 12. In that case, the correction addresses and correction data may be stored on an electrically programmable memory, like a flash ROM, provided inside or outside of the one-chip microcomputer, and a boot program may be made so that any of these values are specified for the address and data registers.

Furthermore, in the foregoing embodiments, operation codes stored on the masked ROM 11 are modified. However, data of any other type can be modified in a similar manner.

Furthermore, in the foregoing embodiments, the data stored on the masked ROM 11 is modified. But it should be easily understandable to those skilled in the art that the inventive data modifier can also modify data stored on any storage medium other than the masked ROM in the same way.

As described above, on finding correspondence between a correction address and one of a predetermined number of addresses including one specified by an address signal, the inventive stored data modifier selectively delivers, on a byte-by-byte basis, either the output data of a storage medium or correction data in accordance with the address signal and correction address. Accordingly, the data modifier can modify data starting at any arbitrary address. For example, the data modifier can modify an operation code that has been stored across an access boundary.

What is claimed is:

1. A circuit for modifying output data of storage means, the storage means outputting a data word with a width of $2^N$ (where N is a natural number) bytes, the data word being stored at respective addresses, starting at an address specified as a multiple of $2^N$ by an address signal, on the storage means, the circuit comprising:

a data register for retaining correction data with the width of $2^N$ bytes thereon;

an address register for retaining a correction address thereon;

a correspondence detector, which receives the address signal and the correction address and determines whether or not correspondence is found between the correction address and one of $2^N$ addresses starting at, the address specified by the address signal or between the correction address and one of $2^N$ addresses preceding the address specified by the address signal; and a stored data selecting section for dividing a given word of the output data of the storage means and the correction data into a plurality of bytes, and selectively outputting in the same word, on a byte-by-byte basis, either an Mth byte (where M is an integer and $0<M<2^N$) of the divided output data of the storage means or an Mth byte of the divided correction data in accordance with the address signal and the correction address if correspondence is found by the correspondence detector, wherein the circuit delivers the output of the stored data selecting section as modified stored data.

2. The circuit of claim 1, wherein the stored data selecting section comprises:

a byte selector for selectively outputting, either the Mth byte of the divided output data of the storage means or the Mth byte of the divided correction data; and a byte selection controller for controlling the selective output of the byte selector in accordance with an Nth-bit value of the address signal, a low-order-(N+1)-bit value of the correction address and the output of the correspondence detector.

3. The circuit of claim 2, wherein the byte selection controller controls the byte selector in such a manner that the Mth byte of the correction data is selected as an Mth-byte output of the byte selector if
   a) the correspondence detector has found the correspondence; and
   b)-i) the Nth-bit value of the address signal is equal to an Nth-bit value of the correction address and a low-order-N-bit value of the correction address is less than (M+1); or b)-ii) the Nth-bit value of the address signal is different from the Nth-bit value of the correction address and the low-order-N-bit value of the correction address is equal to or greater than (M+1), and that an Mth-byte output of the storage means is selected as the Mth-byte output of the byte selector if the conditions a) and b) are not met.

4. The circuit of claim 1, further comprising a data rotator for rotating the correction data on a byte-by-byte basis by the number of bytes that corresponds to a low-order-N-bit value of the correction address, wherein the stored data selecting section receives the output of the data rotator instead of the correction data.

5. The circuit of claim 1, wherein if a result obtained by subtracting a value of the correction address excluding low-order N bits thereof from a value of the address signal excluding low-order N bits thereof is "0" or "1", then correspondence is found by the correspondence detector.

6. A circuit for modifying output data of storage means, the storage means outputting a data word with a width of $2^N$ (where N is a natural number) bytes, the data word being stored at respective addresses, starting at an address specified as a multiple of $2^N$ by an address signal, on the storage means, the circuit comprising:

a number of data registers, each said data register retaining correction data with the width of $2^N$ bytes thereon;

the same number of address registers, each said address register retaining a correction address thereon, the data and address registers forming the same number of register pairs;

the same number of correspondence detectors, each said correspondence detector being associated with one of the register pairs and determining, responsive to the address signal and the correction address retained on the associated address register, whether or not correspondence is found between the correction address and one of $2^N$ addresses starting at the address specified by the address signal or between the correction address and one of $(2^N-1)$ addresses preceding the address specified by the address signal;

a data register selector, which receives the outputs of the correspondence detectors and outputs, as selected correction data, the correction data retained on one of the data registers that is associated with one of the correspondence detectors that has found the correspondence;

an address register selector, which also receives the outputs of the correspondence detectors and outputs, as a selected correction address, the correction address retained on one of the address registers that is associated with the correspondence detector that has found the correspondence; and a stored data selecting section for dividing a given word of the output data of the storage means and the correction data into a plurality of bytes, and selectively outputting in the same word, on a byte-by-byte basis, either an Mth byte (where M is an integer and $0<M<2^N$) of the divided output data of the storage means or an Mth byte of the divided and selected correction data, received from the data register selector, in accordance with the address signal and the selected correction address, received from the address register selector, if correspondence is found by the correspondence detector, wherein the circuit delivers the output of the stored data selecting section as modified stored data.

7. The circuit of claim 6, wherein the stored data selecting section comprises:

a byte selector for selectively outputting either the Mth byte of the divided output data received from the storage means or the Mth byte of the divided and selected correction data received from the data register selector; and a byte selection controller for controlling the selective output of the byte selector in accordance with an Nth-bit value of the address signal, a low-order-(N+1)-bit value of the selected correction address received from the address register selector and the outputs of the correspondence detectors.

8. The circuit of claim 7, wherein the byte selection controller controls the byte selector in such a manner that the Mth byte of the correction data is selected as an Mth-byte output of the byte selector if a) one of the correspondence detectors has found the correspondence; and b)-i) the Nth-bit value of the address signal is equal to an Nth-bit value of the selected correction address and a low-order-N-bit value of the selected correction address is less than (M+1); or b)-ii) the Nth-bit value of the address signal is different from the Nth-bit value of the selected correction address and the low-order-N-bit value of the selected correction address is equal to or greater than (M+1), and that an Mth-byte output of the storage means is selected as the Mth-byte output of the byte selector if the conditions a) and b) are not met.

9. The circuit of claim 6, further comprising a data rotator for rotating the selected correction data on a byte-by-byte basis by the number of bytes that corresponds to a low-order-N-bit value of the selected correction address, wherein the stored data selecting section receives the output of the data rotator instead of the selected correction data.

10. The circuit of claim 6, wherein if a result obtained by subtracting a value of the correction address excluding low-order N bits thereof from a value of the address signal excluding low-order N bits thereof is "0" or if the result is "1" but a low-order-N-bit value of the correction address is not "0", then the correspondence is found by each the correspondence detector.

11. A circuit for modifying output data of storage means, the storage means outputting a data word with a width of N (where N is an integer larger than 1) bytes, the data being stored at respective addresses, starting at an address specified by an address signal, the circuit comprising:

a data register for retaining correction data with the width of N bytes thereon;

an address register for retaining a correction address thereon;

a correspondence detector, which receives the address signal and the correction address and determines whether or not correspondence is found between the correction address and one of N addresses starting at the address specified by the address signal or between the correction address and one of (N−1) addresses preceding the address specified by the address signal; and a stored data selecting section for dividing the output data of the storage means and the correction data, on a byte-by-byte basis, and for selectively outputting in the same word either an Mth byte (where M is an integer and $0 \leq M < N$) of the divided output data of the storage means or an Mth byte of the divided correction data in accordance with the address signal and the correction address if correspondence is found by the correspondence detector, wherein the circuit delivers the output of the stored data selecting section as modified stored data.

\* \* \* \* \*